United States Patent
Liu

(10) Patent No.: US 12,041,620 B2
(45) Date of Patent: Jul. 16, 2024

(54) METHOD AND APPARATUS FOR INDICATING OCCUPATION OF SEMI-PERSISTENT SCHEDULING UNIT, AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 202 days.

(21) Appl. No.: 17/071,173

(22) Filed: Oct. 15, 2020

(65) Prior Publication Data

US 2021/0029734 A1    Jan. 28, 2021

Related U.S. Application Data

(63) Continuation of application No. PCT/CN2018/084498, filed on Apr. 25, 2018.

(51) Int. Cl.
  *H04W 72/23* (2023.01)
  *H04W 72/1263* (2023.01)

(52) U.S. Cl.
  CPC ....... *H04W 72/23* (2023.01); *H04W 72/1263* (2013.01)

(58) Field of Classification Search
  None
  See application file for complete search history.

(56) References Cited

U.S. PATENT DOCUMENTS

| | | | |
|---|---|---|---|
| 8,929,319 B2 * | 1/2015 | Anderson | H04W 74/006 370/329 |
| 2011/0021154 A1 * | 1/2011 | Marinier | H04W 24/08 455/67.11 |
| 2015/0098374 A1 * | 4/2015 | Homchaudhuri | H04W 52/0238 370/311 |

(Continued)

FOREIGN PATENT DOCUMENTS

| | | | |
|---|---|---|---|
| AU | 2010203154 A1 * | 7/2010 | .......... H04W 74/008 |
| CN | 102158971 A | 8/2011 | |

(Continued)

OTHER PUBLICATIONS

Extended European Search Report Issued Nov. 15, 2021 in European Patent Application No. 18916203.5, 10 pages.

(Continued)

*Primary Examiner* — Kenny S Lin
*Assistant Examiner* — Rodrick Mak
(74) *Attorney, Agent, or Firm* — Oblon, McClelland, Maier & Neustadt, L.L.P.

(57) ABSTRACT

Exemplary aspects of the disclosure provide a method and device for indicating occupation of an occasion for sending a Semi-Persistent Scheduling (SPS) unit. An exemplary method can include that a number of one or more alternative occasions for the SPS unit for User Equipment is determined according to statistics on occupation of a current channel within a preset time period. An interval for the SPS unit is determined. Further, the method can include that the number of the one or more alternative occasions and the interval are sent through a Physical Downlink Control Channel (PDCCH).

5 Claims, 14 Drawing Sheets

(56) References Cited

U.S. PATENT DOCUMENTS

| | | | | |
|---|---|---|---|---|
| 2015/0312927 | A1* | 10/2015 | Ko | H04B 7/024 |
| | | | | 370/336 |
| 2017/0019887 | A1* | 1/2017 | Jiang | H04W 72/14 |
| 2017/0290030 | A1* | 10/2017 | Wang | H04L 1/1812 |
| 2017/0303247 | A1* | 10/2017 | Yasukawa | H04L 5/0053 |
| 2018/0014284 | A1 | 1/2018 | Yi et al. | |
| 2019/0230706 | A1* | 7/2019 | Li | H04B 7/088 |
| 2019/0306923 | A1* | 10/2019 | Xiong | H04J 13/0062 |
| 2019/0306924 | A1* | 10/2019 | Zhang | H04B 7/063 |
| 2020/0213043 | A1* | 7/2020 | Hooli | H04W 72/04 |
| 2020/0305138 | A1 | 9/2020 | Li et al. | |
| 2022/0053510 | A1* | 2/2022 | Lei | H04W 8/186 |

FOREIGN PATENT DOCUMENTS

| | | |
|---|---|---|
| CN | 106304350 A | 1/2017 |
| CN | 107197522 A | 9/2017 |
| CN | 107666711 A | 2/2018 |
| CN | 107734543 A | 2/2018 |
| CN | 106162914 B * | 5/2020 |
| EP | 2 566 093 A1 | 3/2013 |
| WO | WO 2017/173616 A1 | 10/2017 |

OTHER PUBLICATIONS

Indian Office Action issued Dec. 14, 2021 in Indian Patent Application No. 202047050992, 6 pages.
3GPP TSG RAN WG1 Meeting #88 R1-1702490, Athens, Greece, Feb. 13-17, 2017, Agenda Item: 8.1.3.4.3: Source: LG Electronics: Title: Discussion on grant-based and grant-free UL transmissions for latency reduction, XP 051209644, 9 pages.
3GPP TSG-RAN WG2 Meeting #98 R2-1705047, Hangzhou, China, May 15-19, 2017, Source: Potevio, Title: Discussion on UL grant-free transmission for URLLC. XP 051275529, 3 pages.
International Search Report mailed Jan. 23, 2019 in International Application No. PCT/CN2018/084498 (with English translation) (5 pages).
Written Opinion issued Jan. 23, 2019 in International Application No. PCT/CN2018/084498 (4 pages).
"On Sensing Design Details for Sidelink V2V Communication" Intel Corporation, 3GPP TSG RAN WG1 Meeting #84bis, R1-162363, Busan, Korea, Apr. 11-15, 2016. 10 pages.
"UE Behaviour when Direction Confliction Between UL GF and Dynamic SFI" Xiaomi, 3GPP TSG RAN WG1 Meeting #92 R1-1802530, Athens, Greece, Feb. 26-Mar. 2, 2018, 4 pages.

* cited by examiner

METHOD AND APPARATUS FOR INDICATING OCCUPATION OF SEMI-PERSISTENT SCHEDULING UNIT, AND BASE STATION

CROSS-REFERENCE TO RELATED APPLICATIONS

This application is a continuation of International Application No. PCT/CN2018/084498 filed on Apr. 25, 2018, the entire contents of which are incorporated herein by reference.

TECHNICAL FIELD

The subject disclosure relates to the field of communication, including to a method and device for indicating occupation of an occasion for sending a Semi-Persistent Scheduling (SPS) unit, a method and device for demodulating an SPS unit, a base station, User Equipment (UE), and a computer-readable storage medium.

BACKGROUND

With rapid development of wireless communication technology, a 5th Generation (5G) mobile communication technology appears. The 3rd Generation Partnership Project (3GPP) recently researched into a 5G New Radio Unlicensed Spectrum (NR-U). A dominant view is that the NR-U may support independent networking. In addition, it is thought that a design in 5G New Radio (NR) should be inherited in the NR-U, as long as it is allowable. In designing an unlicensed spectrum, a first concern is laws related to regions around the globe. For example, by Listen before Talk (LBT) means that an energy probe has to come before signal transmission. LBT has to apply if other equipment is transmitting a signal on a channel under consideration.

Applicable in both 4th Generation (4G) and 5G mobile communication is Semi-Persistent Scheduling (SPS), where a resource for transmitting a regularly transmitted packet, such as of a Voice over Internet Protocol (VoIP), is allocated semi-persistently. That is, once allocated, the resource appears periodically and may be used repeatedly. After SPS has been activated, a base station may perform no Downlink Control Information (DCI) scheduling. User Equipment (UE) may simply use a reserved resource.

However, given LBT, a NR-U may not be available for data transmission on an SPS occasion. Therefore, UE misses the SPS occasion. A base station may make up for the missed occasion by, for example, dynamic scheduling, such as dynamic scheduling using DCI. This, however, may waste a Physical Downlink Control Channel (PDCCH) resource and reduce a benefit brought about by the SPS.

In related art, after an SPS occasion is taken, the SPS occasion will be given up. Data that should have been transmitted for UE on the SPS occasion may have to be scheduled dynamically on an occasion yet to come. However, there is a high probability that an SPS occasion conflict may occur, thereby wasting a lot of public control channel resources.

SUMMARY

In view of this, embodiments herein provide a method and device for indicating occupation of an occasion for sending a Semi-Persistent Scheduling (SPS) unit, a method and device for demodulating an SPS unit, a base station, User Equipment (UE), and a computer-readable storage medium, capable of sending a number of one or more alternative occasions and an interval for an SPS unit for UE through a PDCCH, allowing the UE to determine the one or more alternative occasions according to the number of the one or more alternative occasions and the interval, and receive the SPS unit on the one or more alternative occasions, thereby reducing public control channel resource waste.

According to a first aspect herein, a method for indicating occupation of an occasion for sending a Semi-Persistent Scheduling (SPS) unit is applicable to a base station. The method can include determining a number of one or more alternative occasions for an SPS unit for User Equipment (UE) according to statistics on occupation of a current channel within a preset time period. Further, the method can include determining an interval for the SPS unit, and sending the number of the one or more alternative occasions and the interval through a Physical Downlink Control Channel (PDCCH).

In an embodiment, sending the number of the one or more alternative occasions and the interval through the PDCCH may include generating Downlink Control Information (DCI) carrying the number of the one or more alternative occasions and the interval, and sending the DCI through the PDCCH.

In an embodiment, the method may further include determining the one or more alternative occasions according to the number of the one or more alternative occasions and the interval, and sending the SPS unit on the one or more alternative occasions.

In a further embodiment, the method may further include, in response to determining that the one or more alternative occasions are occupied, sending the SPS unit by dynamic scheduling.

According to a second aspect herein, a method for demodulating a Semi-Persistent Scheduling (SPS) unit is applicable to User Equipment (UE). The method can include receiving a number of one or more alternative occasions and an interval for an SPS unit for the UE sent by a base station through a Physical Downlink Control Channel (PDCCH), and acquiring an SPS occasion allocated to the UE by demodulating information sent via the PDCCH. Further, the method can include, in response to determining that the SPS unit is not received on the SPS occasion, determining the one or more alternative occasions for the SPS unit according to the number of the one or more alternative occasions and the interval, and receiving the SPS unit on the one or more alternative occasions.

In an embodiment, the method may further include, in response to determining that the SPS unit is not received on the one or more alternative occasions, receiving the SPS unit by dynamic scheduling.

In another embodiment, receiving the number of one or more alternative occasions and the interval for the SPS unit for the UE sent by the base station through the PDCCH may include receiving Downlink Control Information (DCI) sent by the base station through the PDCCH, and acquiring the number of the one or more alternative occasions and the interval by demodulating the DCI.

In an embodiment, receiving the DCI sent by the base station through the PDCCH may include receiving the DCI by performing blind detection on the PDCCH using a Semi-Persistent Scheduling Radio Network Temporary Identifier (SPS-RNTI) and a Cell Radio Network Temporary Identifier (C-RNTI).

According to a third aspect herein, a device for indicating occupation of an occasion for sending a Semi-Persistent Scheduling (SPS) unit is applicable to a base station. The device includes a first determining module, a second determining module, and a first sending module. The first determining module is configured to determine a number of one or more alternative occasions for an SPS unit for User Equipment (UE) according to statistics on occupation of a current channel within a preset time period. The second determining module is configured to determine an interval for the SPS unit. The first sending module is configured to send the number of the one or more alternative occasions determined by the first determining module and the interval determined by the second determining module through a Physical Downlink Control Channel (PDCCH).

In an embodiment, the first sending module may include a generating sub-module and a sending sub-module. The generating sub-module may be configured to generate Downlink Control Information (DCI) carrying the number of the one or more alternative occasions and the interval. The sending sub-module may be configured to send the DCI generated by the generating sub-module through the PDCCH.

In another embodiment, the device may further include a third determining module and a second sending module. The third determining module may be configured to determine the one or more alternative occasions according to the number of the one or more alternative occasions and the interval. The second sending module may be configured to send the SPS unit on the one or more alternative occasions determined by the third determining module.

In an embodiment, the device may further include a third sending module. The third sending module may be configured to, in response to determining that the one or more alternative occasions determined by the third determining module are occupied, send the SPS unit by dynamic scheduling.

According to a fourth aspect herein, a device for demodulating a Semi-Persistent Scheduling (SPS) unit is applicable to User Equipment (UE). The device includes a first receiving module, a demodulating module, a determining module, and a second receiving module.

The first receiving module is configured to receive a number of one or more alternative occasions and an interval for an SPS unit for the UE sent by a base station through a Physical Downlink Control Channel (PDCCH). The demodulating module is configured to acquire an SPS occasion allocated to the UE by demodulating information sent via the PDCCH through which the first receiving module receives the number of the one or more alternative occasions and the interval. The determining module is configured to, in response to determining that the SPS unit is not received on the SPS occasion acquired by the demodulating module, determine the one or more alternative occasions for the SPS unit according to the number of the one or more alternative occasions and the interval. The second receiving module is configured to receive the SPS unit on the one or more alternative occasions determined by the determining module.

In an embodiment, the device may further include a third receiving module. The third receiving module may be configured to, in response to determining that the SPS unit is not received on the one or more alternative occasions determined by the determining module, receive the SPS unit by dynamic scheduling.

In an embodiment, the first receiving module may include a receiving sub-module and a demodulating sub-module. The receiving sub-module may be configured to receive Downlink Control Information (DCI) sent by the base station through the PDCCH. The demodulating sub-module may be configured to acquire the number of the one or more alternative occasions and the interval by demodulating the DCI received by the receiving sub-module.

In an embodiment, the receiving sub-module is configured to receive the DCI by performing blind detection on the PDCCH using a Semi-Persistent Scheduling Radio Network Temporary Identifier (SPS-RNTI) and a Cell Radio Network Temporary Identifier (C-RNTI).

According to a fifth aspect herein, a base station includes a processor and memory. The memory is configured to store an instruction executable by the processor. The processor can be configured to perform operations including determining a number of one or more alternative occasions for an SPS unit for User Equipment (UE) according to statistics on occupation of a current channel within a preset time period, determining an interval for the SPS unit, and sending the number of the one or more alternative occasions and the interval through a Physical Downlink Control Channel (PDCCH).

According to a sixth aspect herein, User Equipment (UE) includes a processor and memory. The memory is configured to store an instruction executable by the processor. The processor is configured to perform operations including receiving a number of one or more alternative occasions and an interval for an SPS unit for the UE sent by a base station through a Physical Downlink Control Channel (PDCCH), and acquiring an SPS occasion allocated to the UE by demodulating information sent via the PDCCH. The processor can be further configured to perform the operations of, in response to determining that the SPS unit is not received on the SPS occasion, determining the one or more alternative occasions for the SPS unit according to the number of the one or more alternative occasions and the interval, and receiving the SPS unit on the one or more alternative occasions.

According to a seventh aspect herein, a non-transitory computer-readable storage medium has stored thereon instructions which, when executed by a processor, implement a method for indicating occupation of an occasion for sending an SPS unit herein.

According to an eighth aspect herein, a non-transitory computer-readable storage medium has stored thereon instructions which, when executed by a processor, implement a method for indicating occupation of an occasion for sending an SPS unit herein.

A technical solution herein includes beneficial effects. For example, a number of one or more alternative occasions for an SPS unit for User Equipment (UE) is determined according to statistics on occupation of a current channel within a preset time period. An interval for the SPS unit is determined. The number of the one or more alternative occasions and the interval are sent through a Physical Downlink Control Channel (PDCCH). Accordingly, the UE is allowed to determine the one or more alternative occasions for the SPS unit according to the number of the one or more alternative occasions and the interval, and receive the SPS unit on the one or more alternative occasions, reducing a number of times the SPS unit is scheduled, thereby reducing public control channel resource waste.

If an SPS unit fails to be received at an SPS occasion allocated, one or more alternative occasions for the SPS unit may be determined according to a number of the one or more alternative occasions and an interval received. The SPS unit may be received on the one or more alternative occasions, reducing a number of times a base station schedules the SPS unit, thereby reducing public control channel resource waste.

The above general description and detailed description below are but exemplary and explanatory, and do not limit the subject disclosure.

BRIEF DESCRIPTION OF THE DRAWINGS

Drawings here are incorporated in and constitute part of the subject disclosure, illustrate exemplary embodiments according to the subject disclosure, and together with the subject disclosure, serve to explain the principle of the subject disclosure.

DETAILED DESCRIPTION

Figure 1:
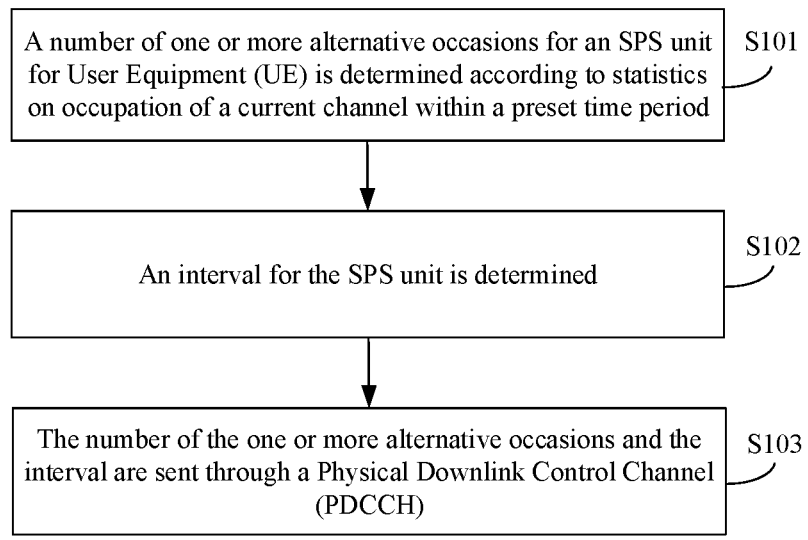
FIG. 1 is a flowchart of a method for indicating occupation of an occasion for sending an SPS unit according to an exemplary embodiment herein.

Exemplary embodiments, examples of which are illustrated in the accompanying drawings, are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device (i.e., device) and method in accordance with certain aspects of the subject disclosure as recited in the accompanying claims.

FIG. 1 is a flowchart of a method for indicating occupation of an occasion for sending an SPS unit according to an exemplary embodiment herein. Description in the embodiment may apply to a base station. As shown in FIG. 1, the method for indicating occupation of an occasion for sending an SPS unit may include an option as follows.

In step S101, a number of one or more alternative occasions for an SPS unit for User Equipment (UE) is determined according to statistics on occupation of a current channel within a preset time period. A preset time period may be set as needed. An SPS unit may be, but is not limited to, an SPS frame, an SPS time slot, and the like.

In the embodiment, a number of one or more alternative occasions for an SPS unit for UE may be determined according to statistics on occupation of a current channel within a preset time period. The more seriously a current channel is occupied, the more alternative occasions for an SPS unit for UE. A number of one or more alternative occasions for an SPS frame for UE may be 1, 2, etc.

In step S102, an interval for the SPS unit is determined. The interval may refer to an interval between a current occasion and an alternative occasion.

In step S103, the number of the one or more alternative occasions and the interval are sent through a Physical Downlink Control Channel (PDCCH). The number of the one or more alternative occasions and the interval may be sent through a PDCCH in a number of modes. For example, Downlink Control Information (DCI) carrying the number of the one or more alternative occasions and the interval may be generated. The DCI may be sent through the PDCCH.

With the embodiment, a number of one or more alternative occasions for an SPS unit for User Equipment (UE) is determined according to statistics on occupation of a current channel within a preset time period. An interval for the SPS unit is determined. The number of the one or more alternative occasions and the interval are sent through a Physical Downlink Control Channel (PDCCH). Accordingly, the UE is allowed to determine the one or more alternative occasions for the SPS unit according to the number of the one or more alternative occasions and the interval, and receive the SPS unit on the one or more alternative occasions, reducing a number of times the SPS unit is scheduled, thereby reducing public control channel resource waste.

Figure 2:
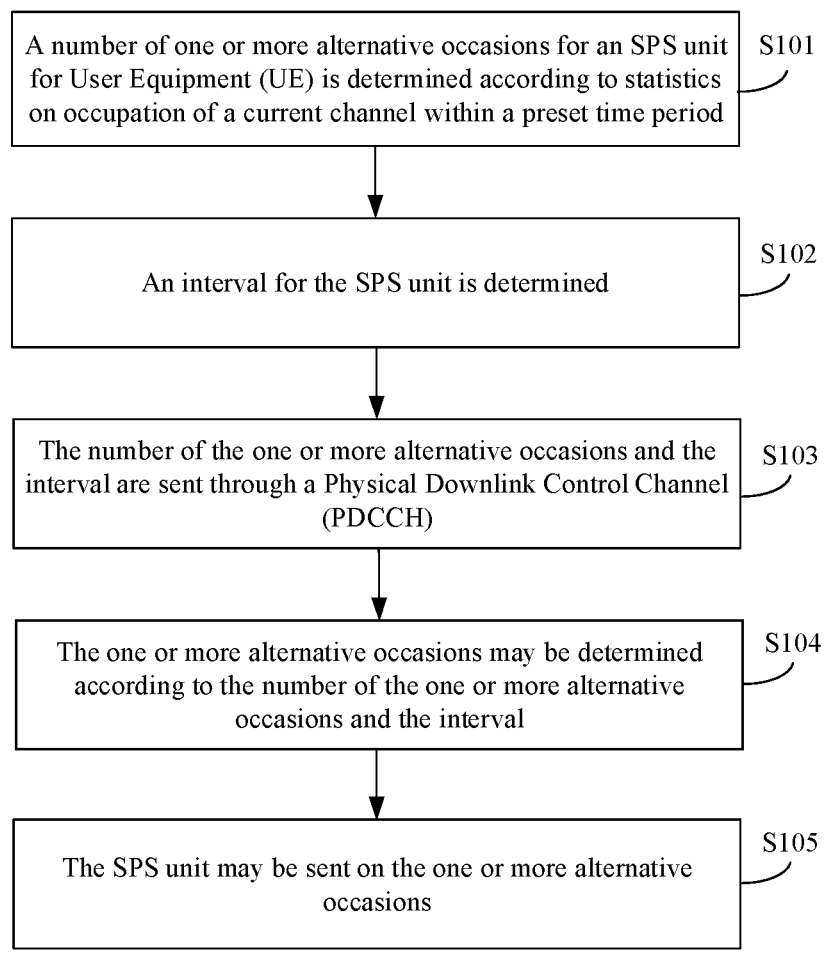
FIG. 2 is a flowchart of a method for indicating occupation of an occasion for sending an SPS unit according to an exemplary embodiment herein.

FIG. 2 is a flowchart of a method for indicating occupation of an occasion for sending an SPS unit according to an exemplary embodiment herein. As shown in FIG. 2, after S103, the method for indicating occupation of an occasion for sending an SPS unit may further include an option as follows.

In step S104, the one or more alternative occasions may be determined according to the number of the one or more alternative occasions and the interval. Assume that the number of the one or more alternative occasions is 1. Then, there may be 1 alternative occasion for sending the SPS unit such as an SPS frame. Assume that the SPS unit such as an SPS frame is to be sent on a primary occasion (referred to as an occasion 1), the interval is determined as σ, and an occasion 1+σ is referred to as an occasion 2. Then, it may be determined that the alternative occasion is the occasion 2.

Assume that the number of the one or more alternative occasions is 2. Then, there may be 2 alternative occasions for sending the SPS unit such as an SPS frame. Assume that the SPS unit such as an SPS frame is to be sent on a primary occasion (referred to as an occasion 1), the interval is determined as σ, an occasion 1+σ is referred to as an occasion 2, and a occasion 1+2σ is referred to as an occasion 3. Then, it may be determined that the one or more alternative occasions are the occasion 2 and the occasion 3.

In step S105, the SPS unit may be sent on the one or more alternative occasions. For example, an alternative occasion, i.e., an occasion 2, may be determined. Then, when an SPS frame fails to be sent on a primary occasion, the SPS frame may be sent at the occasion 2.

The number of the one or more alternative occasions may be greater than 1. Then, when an SPS frame fails to be sent on a primary occasion, the SPS frame may be sent at a first alternative occasion. If the SPS frame fails to be sent at the first alternative occasion, the SPS frame may be sent at a second alternative occasion, and so on. For example, it may be determined that the first alternative occasion is an occasion 2 and the second alternative occasion is an occasion 3. Then, when the SPS frame fails to be sent on the primary occasion, the SPS frame may be sent at the occasion 2. If the SPS frame fails to be sent at the occasion 2, the SPS frame may be sent at the occasion 3.

With the embodiment, an alternative occasion is determined. An SPS unit is sent at the alternative occasion, reducing a number of times the SPS unit is scheduled, thereby reducing public control channel resource waste.

Figure 3:
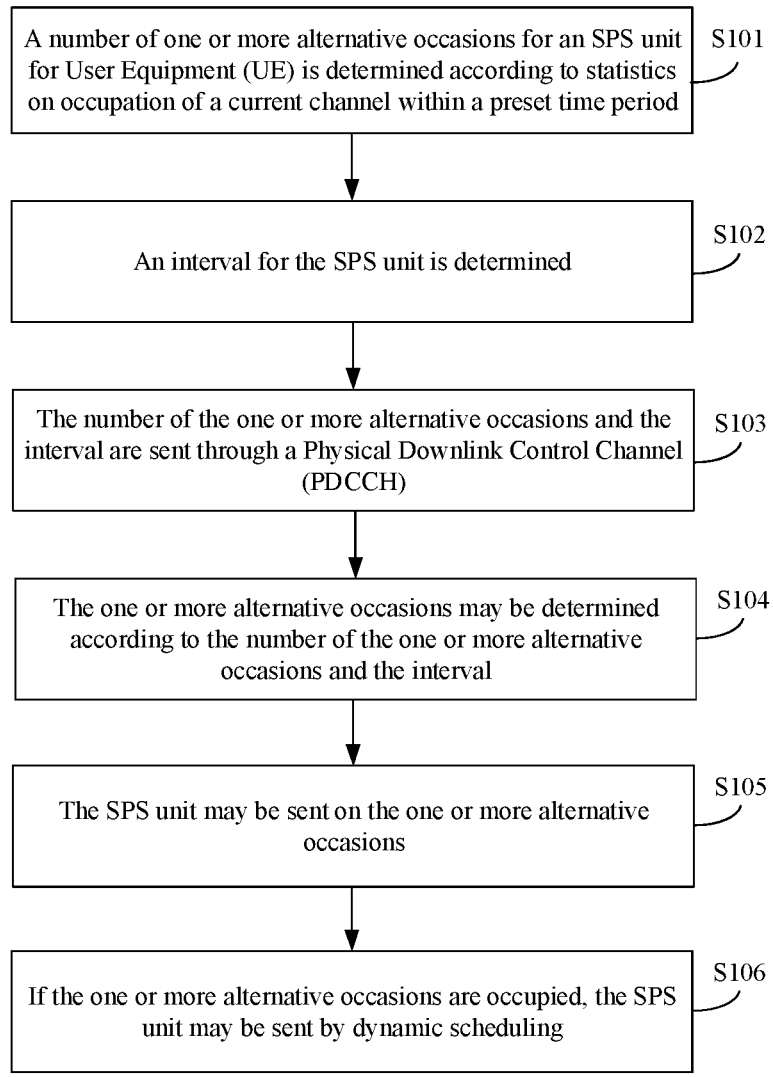
FIG. 3 is a flowchart of a method for indicating occupation of an occasion for sending an SPS unit according to an exemplary embodiment herein.

FIG. 3 is a flowchart of a method for indicating occupation of an occasion for sending an SPS unit according to an exemplary embodiment herein. As shown in FIG. 3, the method for indicating occupation of an occasion for sending an SPS unit may further include an option as follows.

In step S106, if the one or more alternative occasions are occupied, the SPS unit may be sent by dynamic scheduling. In the embodiment, after the one or more alternative occasions have been determined, if the one or more alternative occasions are occupied and there are data to be transmitted in the SPS frame, the SPS unit such as the SPS frame may be sent by dynamic scheduling. With the embodiment, if the one or more alternative occasions are occupied, the SPS unit is sent by dynamic scheduling, thereby ensuring normal data transmission.

Figure 4:
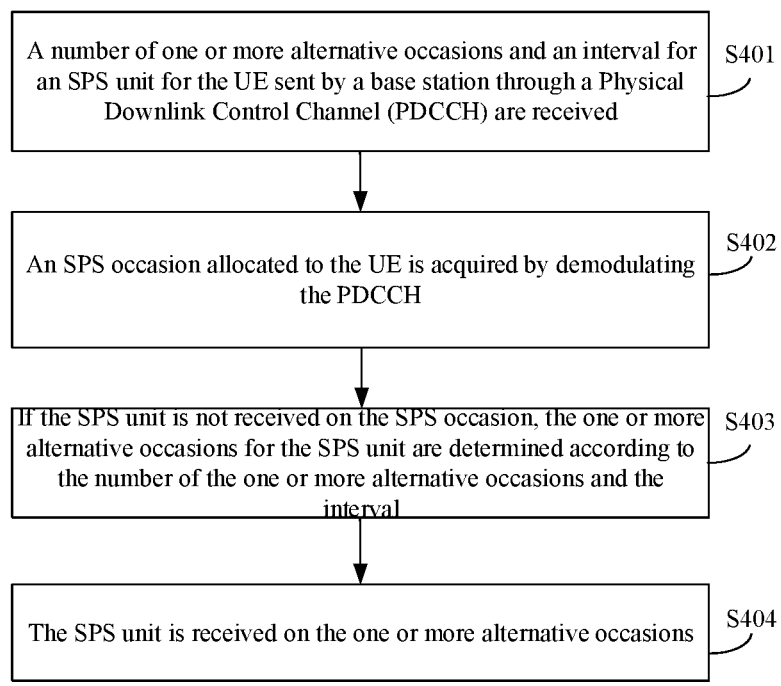
FIG. 4 is a flowchart of a method for demodulating an SPS unit according to an exemplary embodiment herein.

FIG. 4 is a flowchart of a method for demodulating an SPS unit according to an exemplary embodiment herein. Description in the embodiment may apply to UE. As shown in FIG. 4, the method may include an option as follows.

In step S401, a number of one or more alternative occasions and an interval for an SPS unit for the UE sent by a base station through a Physical Downlink Control Channel (PDCCH) are received. The UE may receive Downlink Control Information (DCI) sent by the base station through the PDCCH. The UE may acquire the number of the one or more alternative occasions and the interval by demodulating the DCI. In the embodiment, the UE may receive the DCI by performing blind detection on the PDCCH using a Semi-Persistent Scheduling Radio Network Temporary Identifier (SPS-RNTI) and a Cell Radio Network Temporary Identifier (C-RNTI).

In step S402, an SPS occasion allocated to the UE is acquired by demodulating information sent via the PDCCH.

In step S403, if the SPS unit is not received on the SPS occasion, the one or more alternative occasions for the SPS unit are determined according to the number of the one or more alternative occasions and the interval.

In step S404, the SPS unit is received on the one or more alternative occasions.

If the UE fails to receive the SPS unit at the SPS occasion allocated to the UE, the UE may determine the one or more alternative occasions for the SPS unit according to the number of the one or more alternative occasions and the interval, and receive the SPS unit on the one or more alternative occasions. Assume that there are two alternative occasions. Then, the SPS unit such as an SPS frame may be received first at an alternative occasion 1. If the SPS unit such as the SPS frame fails to be received at the alternative occasion 1, the SPS unit such as the SPS frame may be received at an alternative occasion 2.

With the embodiment, if an SPS unit fails to be received at an SPS occasion allocated, one or more alternative occasions for the SPS unit may be determined according to a number of the one or more alternative occasions and an interval received. The SPS unit may be received on the one or more alternative occasions, reducing a number of times a base station schedules the SPS unit, thereby reducing public control channel resource waste.

Figure 5:
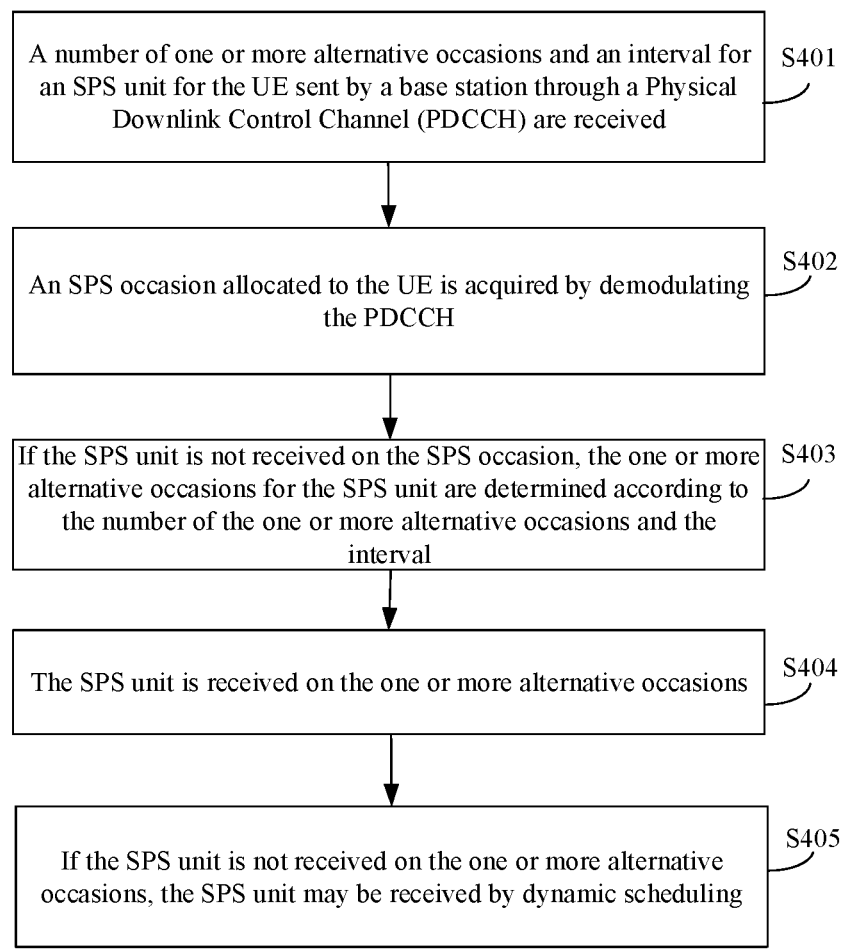
FIG. 5 is a flowchart of a method for demodulating an SPS unit according to an exemplary embodiment herein.

FIG. 5 is a flowchart of a method for demodulating an SPS unit according to an exemplary embodiment herein. As shown in FIG. 5, the method may further include an option as follows.

In step S405, if the SPS unit is not received on the one or more alternative occasions, the SPS unit may be received by dynamic scheduling. If the UE does not receive the SPS unit on the one or more alternative occasions, the UE may receive the SPS unit by dynamic scheduling, thereby ensuring normal data reception. With the embodiment, if the SPS unit is not received on the one or more alternative occasions, the SPS unit may be received by dynamic scheduling, thereby ensuring normal data reception.

Figure 6:
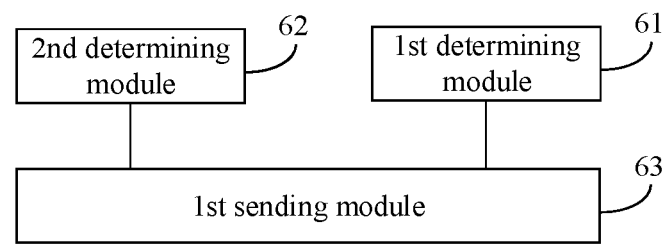
FIG. 6 is a block diagram of a device for indicating occupation of an occasion for sending an SPS unit according to an exemplary embodiment.

FIG. 6 is a block diagram of a device for indicating occupation of an occasion for sending an SPS unit according to an exemplary embodiment. The device may be located in a base station. As shown in FIG. 6, the device may include a first determining module 61, a second determining module 62, and a first sending module 63. Of course, it should be understood that one or more of modules described in the disclosure can be implemented by processing circuitry.

The first determining module 61 is configured to determine a number of one or more alternative occasions for an SPS unit for User Equipment (UE) according to statistics on occupation of a current channel within a preset time period. A preset time period may be set as needed. An SPS unit may be, but is not limited to, an SPS frame, an SPS time slot, and the like.

In the embodiment, a number of one or more alternative occasions for an SPS unit for UE may be determined according to statistics on occupation of a current channel within a preset time period. The more seriously a current channel is occupied, the more alternative occasions for an SPS unit for UE. A number of one or more alternative occasions for an SPS frame for UE may be 1, 2, etc.

The second determining module 62 is configured to determine an interval for the SPS unit. The interval may refer to an interval between a current occasion and an alternative occasion.

The first sending module 63 can be configured to send the number of the one or more alternative occasions determined by the first determining module 61 and the interval determined by the second determining module 62 through a Physical Downlink Control Channel (PDCCH). The number of the one or more alternative occasions and the interval may be sent through a PDCCH in a number of modes. For example, Downlink Control Information (DCI) carrying the number of the one or more alternative occasions and the interval may be generated. The DCI may be sent through the PDCCH.

With the embodiment, a number of one or more alternative occasions for an SPS unit for User Equipment (UE) is determined according to statistics on occupation of a current channel within a preset time period. An interval for the SPS unit is determined. The number of the one or more alternative occasions and the interval are sent through a Physical Downlink Control Channel (PDCCH). Accordingly, the UE is allowed to determine the one or more alternative occasions for the SPS unit according to the number of the one or more alternative occasions and the interval, and receive the SPS unit on the one or more alternative occasions, reducing a number of times the SPS unit is scheduled, thereby reducing public control channel resource waste.

Figure 7:
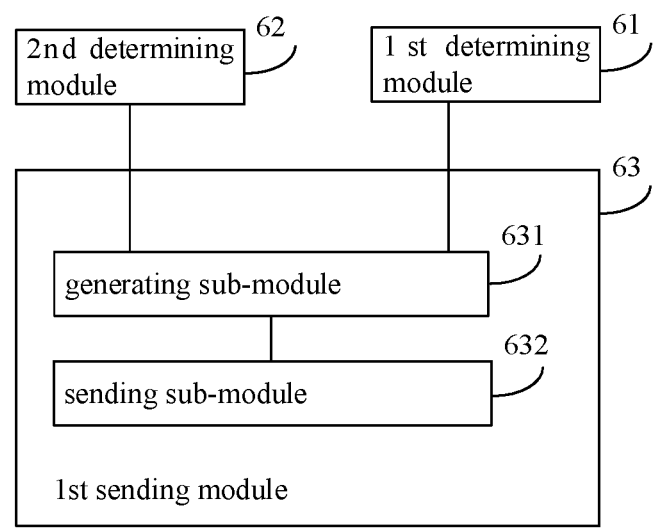
FIG. 7 is a block diagram of a device for indicating occupation of an occasion for sending an SPS unit according to an exemplary embodiment.

FIG. 7 is a block diagram of a device for indicating occupation of an occasion for sending an SPS unit according to an exemplary embodiment. As shown in FIG. 7, based on the embodiment shown in FIG. 6, the first sending module 63 may include a generating sub-module 631 and a sending sub-module 632.

The generating sub-module 631 may be configured to generate Downlink Control Information (DCI) carrying the number of the one or more alternative occasions and the interval.

The sending sub-module 632 may be configured to send the DCI generated by the generating sub-module 631 through the PDCCH.

The number of the one or more alternative occasions and the interval may be sent through a PDCCH in a number of modes. For example, Downlink Control Information (DCI) carrying the number of the one or more alternative occasions and the interval may be generated. The DCI may be sent through the PDCCH.

With the embodiment, DCI carrying a number of one or more alternative occasions and an interval are generated. The DCI is sent through a PDCCH. Accordingly, the number of the one or more alternative occasions and the interval are sent through the PDCCH.

Figure 8:
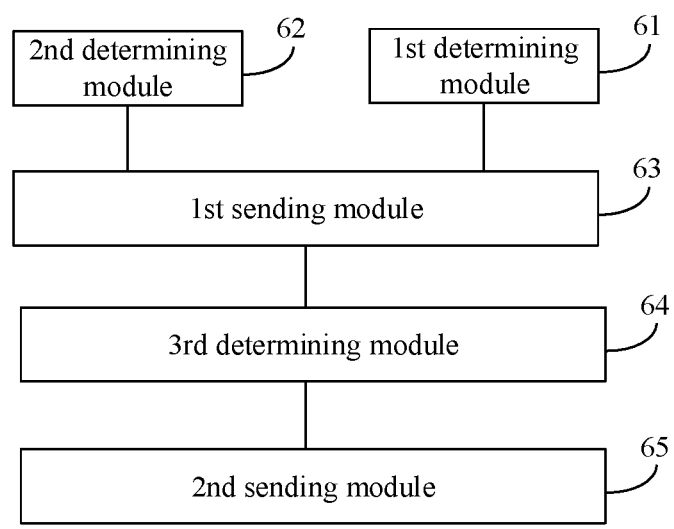
FIG. 8 is a block diagram of a device for indicating occupation of an occasion for sending an SPS unit according to an exemplary embodiment.

FIG. 8 is a block diagram of a device for indicating occupation of an occasion for sending an SPS unit according to an exemplary embodiment. As shown in FIG. 8, based on the embodiment shown in FIG. 6, the device may further include a third determining module 64 and a second sending module 65.

The third determining module 64 may be configured to determine the one or more alternative occasions according to the number of the one or more alternative occasions and the interval.

Assume that the number of the one or more alternative occasions is 1. Then, there may be 1 alternative occasion for sending the SPS unit such as an SPS frame. Assume that the SPS unit such as an SPS frame is to be sent on a primary occasion (referred to as an occasion 1), the interval is determined as σ, and an occasion 1+σ is referred to as an occasion 2. Then, it may be determined that the alternative occasion is the occasion 2.

Assume that the number of the one or more alternative occasions is 2. Then, there may be 2 alternative occasions for sending the SPS unit such as an SPS frame. Assume that the SPS unit such as an SPS frame is to be sent on a primary occasion (referred to as an occasion 1), the interval is determined as σ, an occasion 1+σ is referred to as an occasion 2, and a occasion 1+2σ is referred to as a occasion 3. Then, it may be determined that the one or more alternative occasions are the occasion 2 and the occasion 3.

The second sending module 65 may be configured to send the SPS unit on the one or more alternative occasions determined by the third determining module 64. For example, an alternative occasion, i.e., an occasion 2, may be determined. Then, when an SPS frame fails to be sent on a primary occasion, the SPS frame may be sent at the occasion 2.

The number of the one or more alternative occasions may be greater than 1. Then, when an SPS frame fails to be sent on a primary occasion, the SPS frame may be sent at a first alternative occasion. If the SPS frame fails to be sent at the first alternative occasion, the SPS frame may be sent at a second alternative occasion, and so on. For example, it may be determined that the first alternative occasion is an occasion 2 and the second alternative occasion is an occasion 3. Then, when the SPS frame fails to be sent on the primary occasion, the SPS frame may be sent at the occasion 2. If the SPS frame fails to be sent at the occasion 2, the SPS frame may be sent at the occasion 3.

With the embodiment, an alternative occasion is determined. An SPS unit is sent at the alternative occasion, reducing a number of times the SPS unit is scheduled, thereby reducing public control channel resource waste.

Figure 9:
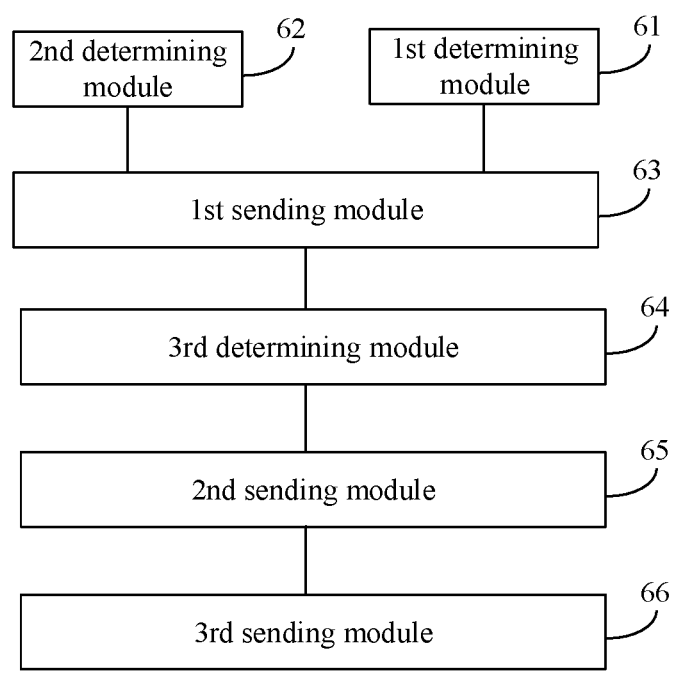
FIG. 9 is a block diagram of a device for indicating occupation of an occasion for sending an SPS unit according to an exemplary embodiment.

FIG. 9 is a block diagram of a device for indicating occupation of an occasion for sending an SPS unit according to an exemplary embodiment. As shown in FIG. 9, based on the embodiment shown in FIG. 8, the device may further include a third sending module 66.

The third sending module 66 may be configured to, in response to determining that the one or more alternative occasions determined by the third determining module 64 are occupied, send the SPS unit by dynamic scheduling.

In the embodiment, after the one or more alternative occasions have been determined, if the one or more alternative occasions are occupied and there are data to be transmitted in the SPS frame, the SPS unit such as the SPS frame may be sent by dynamic scheduling.

With the embodiment, if the one or more alternative occasions are occupied, the SPS unit is sent by dynamic scheduling, thereby ensuring normal data transmission.

Figure 10:
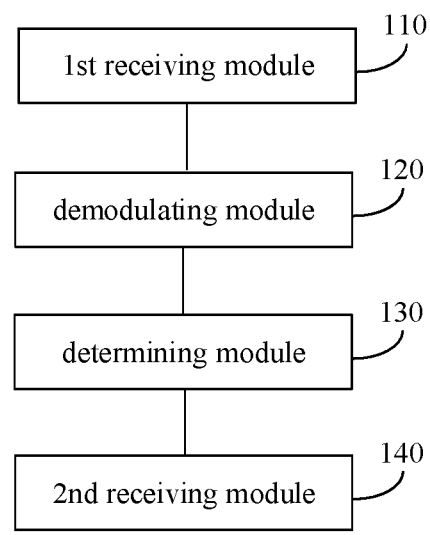
FIG. 10 is a block diagram of a device for demodulating an SPS unit according to an exemplary embodiment.

FIG. 10 is a block diagram of a device for demodulating an SPS unit according to an exemplary embodiment. The device may be located in UE. As shown in FIG. 10, the device may include a first receiving module 110, a demodulating module 120, a determining module 130, and a second receiving module 140.

The first receiving module 110 is configured to receive a number of one or more alternative occasions and an interval for an SPS unit for the UE sent by a base station through a Physical Downlink Control Channel (PDCCH).

The demodulating module 120 is configured to acquire an SPS occasion allocated to the UE by demodulating information sent via the PDCCH through which the first receiving module 110 receives the number of the one or more alternative occasions and the interval.

The determining module 130 is configured to, in response to determining that the SPS unit is not received on the SPS occasion acquired by the demodulating module 120, determine the one or more alternative occasions for the SPS unit according to the number of the one or more alternative occasions and the interval.

The second receiving module 140 is configured to receive the SPS unit on the one or more alternative occasions determined by the determining module 130.

If the UE fails to receive the SPS unit at the SPS occasion allocated to the UE, the UE may determine the one or more alternative occasions for the SPS unit according to the number of the one or more alternative occasions and the interval, and receive the SPS unit on the one or more alternative occasions. Assume that there are two alternative occasions. Then, the SPS unit such as an SPS frame may be received first at an alternative occasion 1. If the SPS unit such as the SPS frame fails to be received at the alternative occasion 1, the SPS unit such as the SPS frame may be received at an alternative occasion 2.

With the embodiment, if an SPS unit fails to be received at an SPS occasion allocated, one or more alternative occasions for the SPS unit may be determined according to a number of the one or more alternative occasions and an interval received. The SPS unit may be received on the one or more alternative occasions, reducing a number of times a base station schedules the SPS unit, thereby reducing public control channel resource waste.

Figure 11:
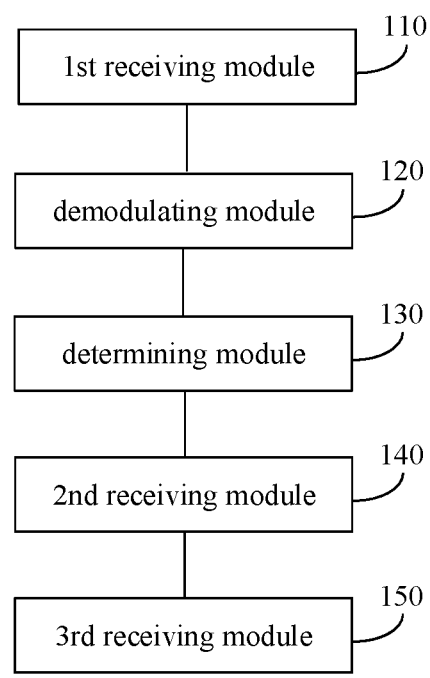
FIG. 11 is a block diagram of a device for demodulating an SPS unit according to an exemplary embodiment.

FIG. 11 is a block diagram of a device for demodulating an SPS unit according to an exemplary embodiment. As shown in FIG. 11, based on the embodiment shown in FIG. 10, the device may further include a third receiving module 150.

The third receiving module 150 may be configured to, in response to determining that the SPS unit is not received on the one or more alternative occasions determined by the determining module 130, receive the SPS unit by dynamic scheduling.

When the SPS unit fails to be received at any alternative occasion, the SPS unit may be received by dynamic scheduling, thereby ensuring normal data reception.

With the embodiment, if the SPS unit is not received on the one or more alternative occasions, the SPS unit may be received by dynamic scheduling, thereby ensuring normal data reception.

Figure 12:
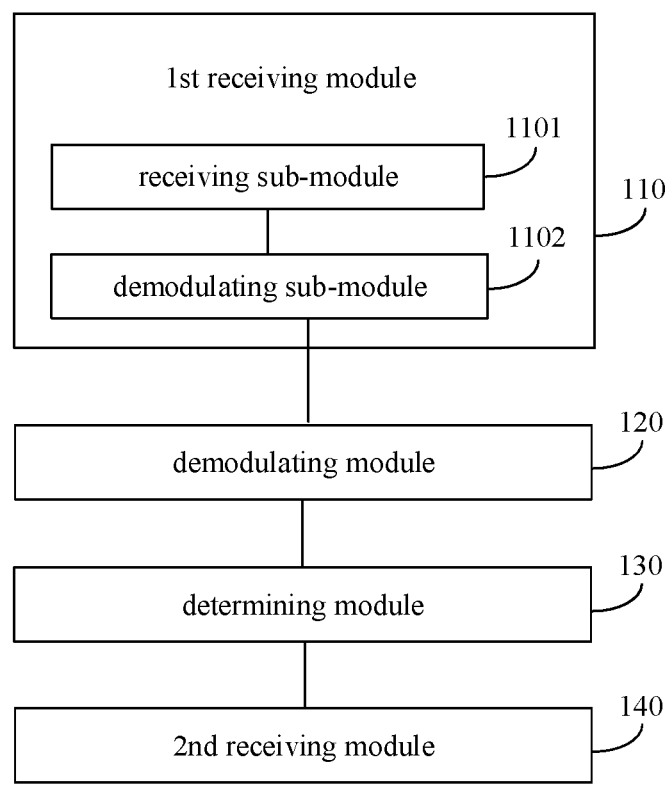
FIG. 12 is a block diagram of a device for demodulating an SPS unit according to an exemplary embodiment.

FIG. 12 is a block diagram of a device for demodulating an SPS unit according to an exemplary embodiment. As shown in FIG. 12, based on the embodiment shown in FIG. 10, the first receiving module 110 may include a receiving sub-module 1101 and a demodulating sub-module 1102.

The receiving sub-module 1101 may be configured to receive Downlink Control Information (DCI) sent by the base station through the PDCCH.

The demodulating sub-module 1102 may be configured to acquire the number of the one or more alternative occasions and the interval by demodulating the DCI received by the receiving sub-module 1101.

The receiving sub-module 1101 may be configured to receive the DCI by performing blind detection on the PDCCH using a Semi-Persistent Scheduling Radio Network Temporary Identifier (SPS-RNTI) and a Cell Radio Network Temporary Identifier (C-RNTI).

With the embodiment, DCI sent by a base station through a PDCCH is received. A number of one or more alternative occasions and an interval are acquired by demodulating the DCI received. Accordingly, a number of one or more alternative occasions and an interval for an SPS unit for UE sent by a base station through a PDCCH are received.

Figure 13:
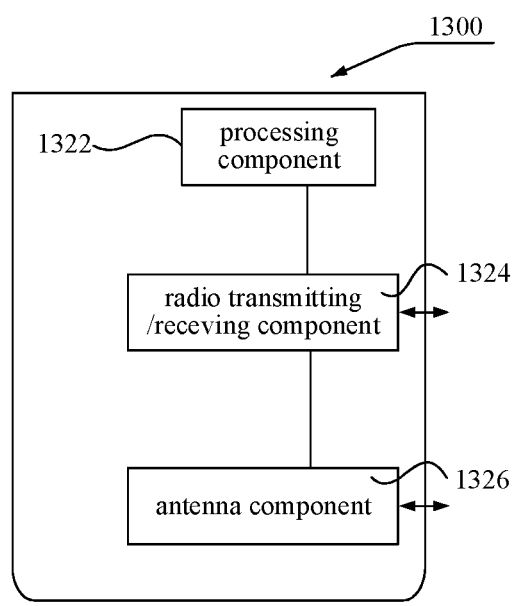
FIG. 13 is a block diagram of a device for indicating occupation of an occasion for sending an SPS unit according to an exemplary embodiment.

FIG. 13 is a block diagram of a device for indicating occupation of an occasion for sending an SPS unit according to an exemplary embodiment. The device 1300 may be provided as a base station. Referring to FIG. 13, the device 1300 may include a processing component 1322, a radio transmitting/receiving component 1324, an antenna component 1326, and a signal processing part dedicated to a radio interface. The processing component 1322 may further include one or more processors.

A processor of the processing component 1322 may be configured to implement determining a number of one or more alternative occasions for an SPS unit for User Equipment (UE) according to statistics on occupation of a current channel within a preset time period. Further, the processing component 1322 can be configured to implement determining an interval for the SPS unit, and sending the number of the one or more alternative occasions and the interval through a Physical Downlink Control Channel (PDCCH).

In an exemplary embodiment, a non-transitory computer-readable storage medium including instructions which, when executed by the processing component 1322 of the device 1300, implement a method for indicating occupation of an occasion for sending an SPS unit herein. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

Figure 14:
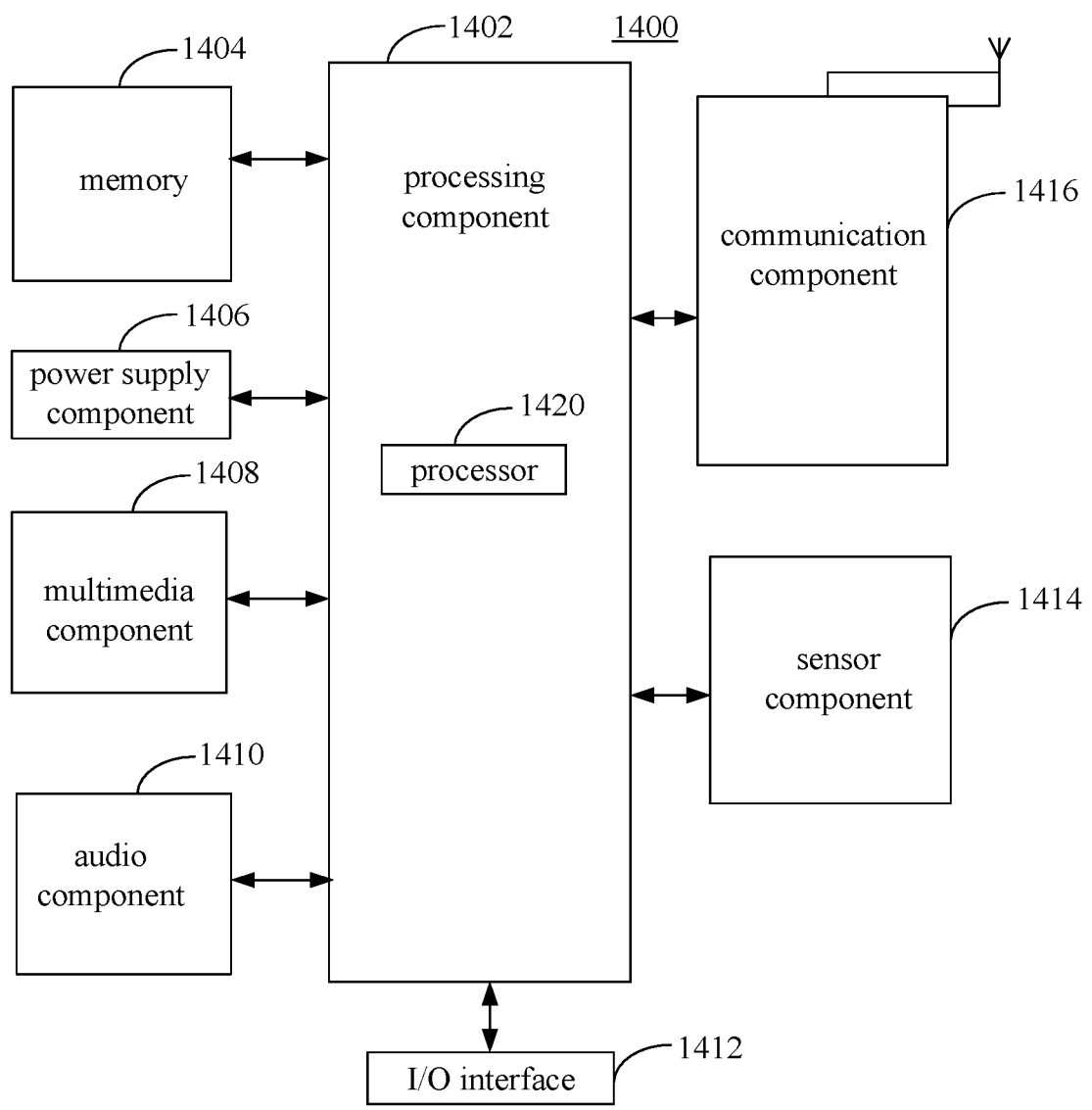
FIG. 14 is a block diagram of a device for demodulating an SPS unit according to an exemplary embodiment.

FIG. 14 is a block diagram of a device for demodulating an SPS unit according to an exemplary embodiment. For example, the device 1400 may be UE such as a mobile phone, a computer, digital broadcast UE, messaging equipment, a gaming console, tablet equipment, medical equipment, fitness equipment, a personal digital assistant, and the like.

Referring to FIG. 14, the device 1400 may include at least one of a processing component 1402, memory 1404, a power supply component 1406, a multimedia component 1408, an audio component 1410, an Input/Output (I/O) interface 1412, a sensor component 1414, a communication component 1416, and the like.

The processing component 1402 may generally control an overall operation of the device 1400, such as operations associated with display, a telephone call, data communication, a camera operation, a recording operation, etc. The processing component 1402 may include one or more processors 1420 to execute instructions so as to complete all or a part of an aforementioned method. In addition, the processing component 1402 may include one or more modules to facilitate interaction between the processing component 1402 and other components. For example, the processing component 1402 may include a multimedia portion to facilitate interaction between the multimedia component 1408 and the processing component 1402.

A processor 1420 of the processing component 1402 may be configured to implement receiving a number of one or more alternative occasions and an interval for an SPS unit for the UE sent by a base station through a Physical Downlink Control Channel (PDCCH), and acquiring an SPS occasion allocated to the UE by demodulating information sent via the PDCCH. Further, the processor component 1402 can be configured to, in response to determining that the SPS unit is not received on the SPS occasion, determining the one or more alternative occasions for the SPS unit according to the number of the one or more alternative occasions and the interval, and receiving the SPS unit on the one or more alternative occasions.

The memory 1404 may be configured to store various types of data to support the operation at the device 1400. Examples of such data may include instructions of any application or method configured to operate on the device 1400, contact data, phonebook data, messages, pictures, videos, and the like. The memory 1404 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 1406 may supply electric power to various components of the device 1400. The power supply component 1406 may include a power management system, one or more power sources, and other components related to generating, managing, and distributing electricity for the device 1400.

The multimedia component 1408 may include a screen that provides an output interface between the device 1400 and a user. The screen may include a Liquid Crystal Display (LCD), a Touch Panel (TP), and the like. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1408 may include at least one of a front camera or a rear camera. When the device 1400 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1410 may be configured to output and/or input an audio signal. For example, the audio component 1410 may include a microphone (MIC). When the device 1400 is in an operation mode such as a call mode, a recording mode, a voice recognition mode, and the like, the MIC may be configured to receive an external audio signal. The received audio signal may be further stored in the memory 1404 or may be sent via the communication component 1416. The audio component 1410 may further include a loudspeaker configured to output the audio signal.

The I/O interface 1412 may provide an interface between the processing component 1402 and a peripheral interface portion. Such a peripheral interface portion may be a keypad, a click wheel, a button, and the like. Such a button may include but is not limited to at least one of a homepage button, a volume button, a start button, or a lock button.

The sensor component 1414 may include one or more sensors for assessing various states of the device 1400. For example, the sensor component 1414 may detect an on/off state of the device 1400 and relative positioning of components such as the display and the keypad of the device 1400. The sensor component 1414 may further detect a change in the position of the device 1400 or of a component of the device 1400, whether there is contact between the device 1400 and a user, the orientation or acceleration/deceleration of the device 1400, a change in the temperature of the device 1400, and the like. The sensor component 1414 may include a proximity sensor configured to detect existence of a nearby object without physical contact. The sensor component 1414 may further include an optical sensor such as a Complementary Metal-Oxide-Semiconductor (CMOS) or a Charge-Coupled-Device (CCD) image sensor used in an imaging application. The sensor component 1414 may further include an acceleration sensor, a gyroscope sensor, a magnetic sensor, a pressure sensor, a temperature sensor, and the like.

The communication component 1416 may be configured to facilitate wired or wireless communication between the device 1400 and other equipment. The device 1400 may access a wireless network based on any communication standard, such as Wi-Fi, 2G, 3G . . . , or a combination thereof. The communication component 1416 may broadcast related information or receive a broadcast signal from an external broadcast management system via a broadcast channel. The communication component 1416 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), and the like.

In an exemplary embodiment, the device 1400 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including instructions, such as memory 1404 including instructions, may be provided. The instructions may be executed by the processor 1420 of the device 1400 to implement the method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

An apparatus embodiment herein basically corresponds to a method embodiment herein, description of which may be referred to for a related part thereof. An apparatus embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above.

Note that herein, a relation term such as "first", "second", etc., is used merely to differentiate one entity or operation from another without necessarily requiring or implying existence of such an actual relation or order between such entities. A term such as "including/comprising", "containing", or any other variant thereof is intended to cover a non-exclusive inclusion, such that a process, method, article, or equipment including a series of elements not only includes the elements, but also includes other element(s) not explicitly listed, or element(s) inherent to such a process, method, article, or equipment. Given no more limitation, an element defined by a phrase "including a . . . " does not exclude existence of another identical element in a process, method, article, or device that includes the element.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

It should be understood that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A method for demodulating a Semi-Persistent Scheduling (SPS) unit applied in a New Radio Unlicensed Spectrum (NR-U) that is performed by User Equipment (UE), the method comprising:
receiving Downlink Control Information (DCI) by performing blind detection on a Physical Downlink Control Channel (PDCCH) using a Semi-Persistent Scheduling Radio Network Temporary Identifier (SPS-RNTI) and a Cell Radio Network Temporary Identifier (C-RNTI);

acquiring a number of one or more alternative occasions and an interval for the SPS unit by demodulating the DCI;

acquiring an SPS occasion allocated to the UE by demodulating information sent via the PDCCH;

determining the one or more alternative occasions for the SPS unit based on the number of the one or more alternative occasions and the interval when the SPS unit is not received on the SPS occasion; and receiving the SPS unit on the one or more alternative occasions.

2. The method of claim 1, further comprising:

receiving the SPS unit by dynamic scheduling when the SPS unit is not received on the one or more alternative occasions.

3. User Equipment (UE) applied in a New Radio Unlicensed Spectrum (NR-U), comprising a processor and memory that is configured to store an instruction executable by the processor, wherein the processor is configured to implement operations comprising:

receiving Downlink Control Information (DCI) by performing blind detection on a Physical Downlink Control Channel (PDCCH) using a Semi-Persistent Scheduling Radio Network Temporary Identifier (SPS-RNTI) and a Cell Radio Network Temporary Identifier (C-RNTI);

acquiring a number of one or more alternative occasions and an interval for a Semi-Persistent Scheduling (SPS) unit by demodulating the DCI;

acquiring an SPS occasion allocated to the UE by demodulating information sent via the PDCCH;

determining the one or more alternative occasions for the SPS unit based on the number of the one or more alternative occasions and the interval when the SPS unit is not received on the SPS occasion; and receiving the SPS unit on the one or more alternative occasions.

4. The UE of claim 3, wherein the processor is further configured to:

receive the SPS unit by dynamic scheduling when the SPS unit is not received on the one or more alternative occasions.

5. A non-transitory computer-readable storage medium having stored thereon instructions which, when executed by a processor, implement operations comprising:

receiving Downlink Control Information (DCI) by performing blind detection on a Physical Downlink Control Channel (PDCCH) using a Semi-Persistent Scheduling Radio Network Temporary Identifier (SPS-RNTI) and a Cell Radio Network Temporary Identifier (C-RNTI);

acquiring a number of one or more alternative occasions and an interval for a Semi-Persistent Scheduling (SPS) unit by demodulating the DCI;

acquiring an SPS occasion allocated to the UE by demodulating information sent via the PDCCH;

determining the one or more alternative occasions for the SPS unit based on the number of the one or more alternative occasions and the interval when the SPS unit is not received on the SPS occasion; and receiving the SPS unit on the one or more alternative occasions.

* * * * *